United States Patent
Shu et al.

(10) Patent No.: US 9,416,322 B2
(45) Date of Patent: Aug. 16, 2016

(54) PROCESS FOR MAKING IMPROVED CATALYSTS FROM CLAY-DERIVED ZEOLITES

(75) Inventors: Yuying Shu, Ellicott City, MD (US); Richard F. Wormsbecher, Dayton, MD (US); Wu-Cheng Cheng, Ellicott City, MD (US); Michael D Wallace, Glenelg, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 522 days.

(21) Appl. No.: 13/578,560

(22) PCT Filed: Mar. 1, 2011

(86) PCT No.: PCT/US2011/026659
§ 371 (c)(1),
(2), (4) Date: Aug. 10, 2012

(87) PCT Pub. No.: WO2011/115746
PCT Pub. Date: Sep. 22, 2011

(65) Prior Publication Data
US 2012/0329639 A1    Dec. 27, 2012

Related U.S. Application Data

(60) Provisional application No. 61/315,308, filed on Mar. 18, 2010.

(51) Int. Cl.
| | |
|---|---|
| *B01J 29/06* | (2006.01) |
| *C10G 11/18* | (2006.01) |
| *B01J 29/70* | (2006.01) |
| *B01J 35/02* | (2006.01) |
| *B01J 35/10* | (2006.01) |
| *B01J 37/00* | (2006.01) |
| *B01J 37/02* | (2006.01) |
| *B01J 29/08* | (2006.01) |
| *B01J 35/00* | (2006.01) |

(52) U.S. Cl.
CPC .............. *C10G 11/18* (2013.01); *B01J 29/061* (2013.01); *B01J 29/088* (2013.01); *B01J 29/7049* (2013.01); *B01J 35/023* (2013.01); *B01J 35/1019* (2013.01); *B01J 35/1038* (2013.01); *B01J 37/0045* (2013.01); *B01J 37/0201* (2013.01); *B01J 35/0006* (2013.01); *B01J 2229/42* (2013.01)

(58) Field of Classification Search
USPC .................................................. 502/65, 73
See application file for complete search history.

(56) References Cited

U.S. PATENT DOCUMENTS

| | | | |
|---|---|---|---|
| 3,293,192 A | 12/1966 | Maher et al. ................. 252/430 |
| 3,338,672 A | 8/1967 | Haden | |
| 3,367,886 A | 2/1968 | Haden et al. .................. 252/455 |
| 3,436,357 A | 4/1969 | Plank et al. ..................... 502/65 |
| 3,459,680 A | 8/1969 | Plan et al. ....................... 502/65 |
| 3,515,511 A | 6/1970 | Flank et al. | |
| 3,574,538 A | 4/1971 | McDaniel ...................... 23/112 |
| 3,733,391 A | 5/1973 | Hoffman ...................... 423/118 |
| 3,930,987 A | 1/1976 | Grand .......................... 208/111 |
| 3,939,246 A | 2/1976 | Rollmann | |
| 4,086,187 A | 4/1978 | Lim et al. ..................... 252/455 |
| 4,166,099 A | 8/1979 | McDaniel ..................... 423/329 |
| 4,206,085 A | 6/1980 | Lim et al. ..................... 252/455 |
| 4,302,622 A | 11/1981 | Chu ............................... 585/467 |
| 4,308,129 A | 12/1981 | Gladrow et al. .............. 208/120 |
| 4,343,723 A | 8/1982 | Rogers et al. ................. 252/455 |
| 4,374,294 A | 2/1983 | Chu ............................... 585/466 |
| 4,399,059 A | 8/1983 | Chu ................................. 502/73 |
| 4,405,443 A | 9/1983 | Bertolacini et al. .......... 208/113 |
| 4,450,443 A | 5/1984 | Dolland | |
| 4,493,902 A | 1/1985 | Brown et al. ................... 502/65 |

(Continued)

FOREIGN PATENT DOCUMENTS

| | | |
|---|---|---|
| CN | 1064499 A | 9/1992 |
| CN | 101143334 A | 3/2008 |

(Continued)

OTHER PUBLICATIONS

American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 17t-183 (1996) by L.T. Boock, T.F. Petti, and J.A. Rudesill.

(Continued)

*Primary Examiner* — Elizabeth Wood
(74) *Attorney, Agent, or Firm* — Charles A. Cross; Beverly J. Artale

(57) ABSTRACT

This invention relates to a process of preparing an improved catalyst comprising a clay derived zeolite. In particular, the invention comprises combining an yttrium compound with a zeolite produced by treating clay with a silica source and under alkaline conditions. The clay derived zeolite can be further combined with conventional matrix and/or binder precursors to form particulates suitable for use as catalysts in fluid catalytic cracking (FCC). Alternatively, the clay that is treated with the silica source and alkaline conditions can be in particulate form having sizes suitable for use in FCC, and the zeolite is produced in situ within the particulate. Yttrium compound is then combined with the zeolite in the particulate, e.g., via impregnation. It has been shown that the addition of the yttrium compound improves zeolite surface area retention, and zeolite stability in catalysts comprising clay derived zeolites.

26 Claims, No Drawings

(56) References Cited

U.S. PATENT DOCUMENTS

| | | | |
|---|---|---|---|
| 4,542,116 A | 9/1985 | Bertolacini et al. | 502/65 |
| 4,631,262 A | 12/1986 | Altomare | 502/65 |
| 4,664,780 A | 5/1987 | Lochow et al. | 208/120 |
| 4,764,269 A | 8/1988 | Edwards et al. | 208/120 |
| 4,793,827 A | 12/1988 | Lochow et al. | 44/65 |
| 4,965,233 A | 10/1990 | Speronello | 502/65 |
| 5,008,225 A | 4/1991 | Magistro et al. | 502/73 |
| 5,071,806 A | 12/1991 | Pecoraro | 502/68 |
| 5,082,815 A | 1/1992 | Macedo | 502/68 |
| 5,085,762 A | 2/1992 | Absil | 208/120 |
| 5,194,413 A | 3/1993 | Kumar | 502/65 |
| 5,227,352 A | 7/1993 | Tsujii et al. | 502/65 |
| 5,258,341 A | 11/1993 | Chitnis et al. | 502/68 |
| 5,395,809 A | 3/1995 | Madon | 502/68 |
| 5,716,896 A | 2/1998 | Knifton et al. | 502/113 |
| 5,891,326 A | 4/1999 | Shi | 209/166 |
| 5,908,547 A | 6/1999 | Chitnis et al. | 208/120.01 |
| 5,997,728 A | 12/1999 | Adewuyi et al. | 208/120.01 |
| 6,030,916 A | 2/2000 | Choudary et al. | 502/65 |
| 6,069,012 A | 5/2000 | Kayser | 436/37 |
| 6,114,267 A | 9/2000 | Ghosh et al. | 502/68 |
| 6,635,169 B1 | 10/2003 | Bhore et al. | 208/120.2 |
| 6,656,347 B2 | 12/2003 | Stockwell et al. | 208/120.01 |
| 6,670,296 B2 | 12/2003 | Labarge et al. | 502/69 |
| 6,716,338 B2 | 4/2004 | Madon et al. | 208/120.01 |
| 6,906,232 B2 | 6/2005 | Levin | 585/638 |
| 7,015,175 B2 | 3/2006 | Vassilakis et al. | 502/217 |
| 7,033,487 B2 | 4/2006 | O'Connor et al. | 208/120.01 |
| 7,125,817 B2 | 10/2006 | Ou | 502/64 |
| 7,160,830 B2 | 1/2007 | Van Der Zon et al. | 502/8 |
| 7,208,446 B2 | 4/2007 | Stamires et al. | 502/355 |
| 7,319,178 B2 | 1/2008 | Levin et al. | 585/640 |
| 7,405,336 B2 | 7/2008 | Kelly et al. | 585/400 |
| 7,442,664 B2 | 10/2008 | Van De Zon | 502/63 |
| 7,641,787 B2 | 1/2010 | Yaluris et al. | 208/119 |
| 7,663,011 B2 | 2/2010 | Shan et al. | 585/533 |
| 7,863,212 B2 | 1/2011 | Wakui | 502/73 |
| 7,902,106 B2 | 3/2011 | Hu | 502/73 |
| 8,845,882 B2 | 9/2014 | Shu et al. | |
| 2005/0042158 A1 | 2/2005 | Yaluris et al. | |
| 2005/0100494 A1 | 5/2005 | Yaluris et al. | |
| 2009/0050527 A1 | 2/2009 | Krishnamoorhy et al. | |
| 2009/0215613 A1 | 8/2009 | Hagemeyer | 502/304 |

FOREIGN PATENT DOCUMENTS

| | | | |
|---|---|---|---|
| CN | 101455979 | 6/2009 | |
| EP | 0409332 | 1/1991 | C07D 249/10 |
| GB | 1483244 | 8/1977 | |
| WO | 9201826 | 2/1992 | |
| WO | 94/15875 | 7/1994 | C01B 33/34 |

OTHER PUBLICATIONS

Breck, D.W., "Zeolite Molecular Sieves", Structural Chemistry & Use (1974) p. 94.

Sadeghbeigi, Fluid Catalytic Cracking Handbook, Gulf Publ. Co. Houston, 1995, ISBN 0-88415-290-1.

G. W. Young, G.D. Weatherbee, and S.W. Davey, "Simulating Commercial FCCU Yields With the Davison Circulating Riser (DCR) Pilot Plant Unit," National Petroleum Refiners Association (NPRA) Paper AM88-52, 1988.

G. W. Young, "Realistic Assessment of FCC Catalyst Performance in the Laboratory," in Fluid Catalytic Cracking: Science and Technology. J. S. Magee and M. M. Mitchell, Jr. Eds., Studies in Surface Science and Catalysis, vol. 76, p. 257, Elsevier Science Publishers B.V., Amsterdam 1993, ISBN 0-444-89037-8.

"Commercial Preparation and Characterization of FCC Catalysts", Fluid Catalytic Cracking: Science and Technology, Studies in Surface Science and Catalysis, vol. 79, p. 120 (1993).

Krishna, Sadeghbeigi, op cit & Scherzer, "Octane Enhancing Zeolitic FCC Catalysts", Marcel Dekker, New York, 1990, ISBN 0-8247-8399-9, pp. 165-178.

Venuto and Habib, Fluid Catalytic Cracking with Zeolite Catalysts, Marcel Dekker, New York 1979, ISBN 0-8247-6870-1.

Johnson. MFL., "Estimation of the Zeolite Content of a Catalyst from Nitrogen Adsorption Isotherms", Journal of Catalysis 52, pp. 425-431 (1978).

Mergado, Edisson et al. "Characterization of Peptized Boehmite Systems: An 27 Al Nuclear Magnetic Resonance Study." Journal of Colloid and Interface Science, 176 (1995): 432-441.

Brindley et al., The Kaolinite-Mullite Reaction Series, Journal of the American Ceramic Society, vol. 42, No. 7 (1959) pp. 311 et al.

Duncan et al., Kinetics and Mechanism of High Temperature Reactions of Kaolinite Minerals, Journal of the American Cermic Society, vol. 52, No. 2, (1969) pp. 74 et al.

PROCESS FOR MAKING IMPROVED CATALYSTS FROM CLAY-DERIVED ZEOLITES

CROSS-REFERENCE TO RELATED APPLICATIONS

This application claims the benefit of the filing date of International Patent Application No. PCT/US2011/06659 filed Mar. 1, 2011, which claims priority and the benefit of U.S. Provisional Patent Application No. 61/315,308 filed Mar. 18, 2010, the disclosure of which is hereby incorporated herein by reference.

FIELD OF THE INVENTION

The present invention relates to a process of making catalysts containing zeolite derived from treating clay with a silica source and under alkaline conditions. The process is particularly relevant for making zeolite for catalysts suitable for use in fluid catalytic cracking processes.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 20 to about 150 µm, preferably from about 50 to about 100 µm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracking products as well as lighter gaseous cracking products of four or less carbon atoms per molecule. The gas partly consists of olefins and partly of saturated hydrocarbons. Bottoms and coke are also produced.

The cracking catalysts typically are prepared from a number of components, each of which is designed to enhance the overall performance of the catalyst. FCC catalysts are generally composed of zeolite, active matrix, clay and binder with all of the components incorporated into a single particle.

The zeolite component is primarily responsible for converting, e.g., cracking, the hydrocarbon. There are a number of zeolites suitable for this purpose. Suitable large pore zeolites include crystalline alumino-silicate zeolites such as synthetic faujasite, i.e., type Y zeolite, type X zeolite, and Zeolite Beta, as well as heat treated (calcined) derivatives thereof. Frequently used zeolites include ultra stable type Y zeolite (USY) such as that disclosed in U.S. Pat. No. 3,293,192.

Zeolites derived from certain clays are also known. See U.S. Pat. No. 3,459,680. Such zeolites can be prepared in crystalline form by treating clay powder with a silica source under alkaline conditions (referred to as caustic in the '680 patent), with the resulting zeolite combined with matrix precursors to form catalyst suitable for use in the conversion process. Pre-formed clay-containing particulates, such as spray dried microspheres, can also be processed into a size and form suitable for such processes, and the zeolite can be produced in situ within the particulates. See U.S. Pat. Nos. 4,493,902 and 6,656,347. In either process, the resulting zeolite contains metal impurities, e.g., those comprising iron, magnesium, calcium and titanium that are typically present in the clays used to make these zeolites. Such impurities tend to destabilize the silica alumina zeolite structure, thus causing the collapse of the structure. This leads to loss of zeolite surface area, and accordingly leads to loss of catalytic activity in hydrocarbon conversion processes. Furthermore, zeolites made from clay tend to have a smaller crystal size and hence lower hydrothermal stability than zeolites made from synthetic starting materials.

SUMMARY OF THE INVENTION

It has been discovered that adding yttrium to a clay derived zeolite can improve retention of zeolite surface area when the clay derived zeolite is a component of a zeolite-containing catalyst.

The inventive process based on this discovery comprises:
(a) treating clay with source of silica and under alkaline conditions to produce zeolite, and
(b) combining the zeolite with yttrium compound, wherein yttrium measured as $Y_2O_3$ is present in the combination in an amount of 0.5 to 15% by weight based on the zeolite.

The invention is particularly suitable when making zeolite from kaolin or kaolin clay that has been calcined to one or more of its characteristic phase transitions, e.g., metakaolin clay, spinel, and/or mullite. Alkali hydroxide, silicate or aluminate are suitable agents for creating the alkaline conditions of the invention. Sodium silicate, colloidal silica, precipitated silica, silica gel, and rice hull ash are suitable sources of silica. The combination of clay and silica source optionally include seeds that facilitate crystallization of zeolite, especially under alkaline conditions.

The invention is particularly suitable for zeolites prepared from clays comprising metal impurities, e.g., compounds derived from iron, magnesium, calcium, and titanium, which metals can be present in the zeolite after the zeolite is produced.

The yttrium compound is combined with the zeolite in amounts in the range of 0.5 to 15% by weight of zeolite, yttrium measured as its oxide $Y_2O_3$. The yttrium compound preferably contains no more than 50 wt % rare earth oxide relative to total yttrium oxide plus rare earth oxide. Accordingly, yttrium compounds comprising rare earth oxide in a weight ratio of 0.01 to 1 rare earth oxide to yttrium oxide are suitable.

Embodiments in which the yttrium compound consists essentially of yttrium compounds or moieties are particularly suitable.

Yttrium compounds selected from the group consisting of yttrium halide, yttrium nitrate, and yttrium sulfate are particularly suitable compounds for this invention.

The zeolite and yttrium compound can then be further processed to produce a catalyst. In one embodiment of the invention, the zeolite produced from the clay comprises crystalline particles having a size in the range of 0.01 to 10 microns. Accordingly, the invention can further comprise combining the combination of zeolite and yttrium with precursors of matrix, the matrix typically forming when the catalyst is formed, e.g., via spray drying.

In another embodiment of the invention, the clay is in particulates, e.g., dried microspheres, having an average particle size in the range of 20 to 150 microns, and zeolite is produced in situ within the clay particulate by treating the clay particulate with a silica source under alkaline conditions.

Zeolites in this form are combined with the yttrium compound by impregnation or ion-exchange of yttrium into the zeolite containing particulate. Impregnation or ion-exchange carried out with an aqueous solution comprising yttrium salt in a concentration in the range of 1 to 40 wt % is particularly suitable for such embodiments. The zeolite particulates can then be further processed, e.g., dried, after its combination with the yttrium compound in (b). In even further processing to produce a catalyst, the zeolite particulates may also be calcined and further exchanged with ammonium salts to lower the sodium level in zeolite particulates.

These and other aspects of the present invention are described in further details below.

DETAILED DESCRIPTION OF THE INVENTION

It has been found that adding yttrium to a clay derived zeolite results in retention of the zeolite's surface area when subject to conditions in a FCC process.

Yttrium is commonly found in rare earth ores, along with lanthanum and lanthanide metals, and has been occasionally referred to as a rare earth metal. Yttrium, however, is not considered a rare earth metal itself. The element yttrium has an atomic number of 39 and therefore does not lie in the rare earth element grouping on the elemental period table, which have atomic numbers from 57 to 71. The metals within this range of atomic numbers include lanthanum (atomic number 57) and lanthanide metals. See, *Hawley's Condensed Chemical Dictionary*, 11$^{th}$ Edition, (1987). The term "rare earth" or "rare earth oxide" is therefore used hereinafter to mean lanthanum and lanthanide metals, or their corresponding oxides.

The term "yttrium compound" is used herein to designate not only yttrium that is in the form a compound such as a yttrium salt, but also in the form of a yttrium cation such as that exchanged on zeolite. The term "yttrium compound" and the term "yttrium" are used interchangeably unless stated otherwise. Unless expressed otherwise herein, weight measurements of yttrium or an yttrium compound refer to that reported as yttrium oxide ($Y_2O_3$) in elemental analysis techniques conventionally used in the art, including but not limited to, inductively coupled plasma (ICP) analytical methods.

For purposes of the invention, the term "zeolite surface area" is used herein to refer to surface area in $m^2/g$ from a zeolite or microporosity less than 20 Angstroms. See, Johnson, M. F. L, *Journal of Catalysis*, Vol. 52, (1978), pp. 425-431.

The present invention preferably makes a catalyst capable of being maintained within a FCC unit. FCC catalysts typically contain zeolite, which is a fine porous powdery material composed of the oxides of silicon and aluminum. The zeolites are typically incorporated into matrix and/or binder and particulated. See "Commercial Preparation and Characterization of FCC Catalysts", *Fluid Catalytic Cracking: Science and Technology*, Studies in Surface Science and Catalysis, Vol. 76, p. 120 (1993). When the aforementioned zeolite particulates are aerated with gas, the particulated catalytic material attains a fluid-like state that allows the material to behave like a liquid. This property permits the catalyst to have enhanced contact with the hydrocarbon feedstock feed to the FCC unit and to be circulated between the FCC reactor and the other units of the overall FCC process (e.g., regenerator). Hence, the term "fluid" has been adopted by the industry to describe this material. FCC catalysts typically have average particle sizes in the range of about 20 to about 150 microns. While the compositions made by this invention have shown to be particularly suitable for use in FCC, it is envisioned that the composition made by this invention also can be used in other catalytic hydrocarbon conversion processes utilizing clay-based zeolite catalyst where it is desirable to retain zeolite surface area and activity of the catalyst.

Zeolite

As mentioned above, the zeolite utilized in this invention is that produced from treating clay with a silica source and under alkaline conditions. Methods for making such zeolites are known and described in Column 8, line 56 through Column 9, line 7 of U.S. Pat. No. 3,459,680, the contents of which are incorporated by reference. Other methods for making zeolite from clay are also disclosed in U.S. Pat. Nos. 4,493,902 and 6,656,347, the contents of which are also incorporated herein by reference. These methods are described in more detail below.

Clays of the montmorillonite and kaolin families are suitable for use in this invention. Kaolin is preferred. Other clays such as those described in the '680 patent are also suitable. The term clay is not only used herein to refer to clay material in the raw form in which they are mined, but also includes raw clays that have been calcined to one or more of their characteristic phase transitions. See Brindley et al., "The Kaolinite-Mullite Reaction Series", *Journal of the American Ceramic Society*, Vol. 42, No. 7, (1959), pp. 311 et al.; Duncan et al., "Kinetics and Mechanism of High-Temperature Reactions of Kaolinite Minerals", *Journal of the American Ceramic Society*, Vol. 52, No. 2, (1969), pp. 74 et al. For example, calcining kaolin clay at temperatures in a range of about 480 to about 985° C. converts kaolin to metakaolin; calcining up to a temperature in the range of about 985 to about 1100° C. converts kaolin or metakaolin to spinel; and calcining up to a temperature greater than 1100° C. converts kaolin and/or the aforementioned kaolin characteristic phase transitions to mullite.

Treatment of the clay can be suitably carried out by contacting the selected clay with a source of silica, such as silica gel, colloidal silica, precipitated silica, rice hull ash, sodium silicate, and/or mixtures thereof, wherein the clay and silica source are contacted or treated under alkaline conditions to crystallize the zeolite, followed by ion-exchange in one or more steps to remove the sodium and optionally introduce metal cations, and calcination at a temperature in the range of about 350 to about 850° C. to ultrastabilize the zeolite. The calcined material can then be further processed. Milling the calcined material to a particle size in the range of 0.01 to 10 microns is particularly suitable when preparing the catalyst in accordance with the '680 patent. In this embodiment, the zeolite will be combined with yttrium compound, and matrix precursors to form a particulate suitable for use in FCC. Particulates made in this fashion commonly have an average particle size in the range of 20 to 150 microns.

A seed is optionally combined with the silica source and clay. Seeds are also known as zeolite initiators. Briefly, a seed is used to initiate crystallization of the zeolite from the aforementioned components, and can include, and "seed" is herein defined as, any material containing silica and alumina that either allows a zeolite crystallization process that would not occur in the absence of the initiator, or shortens significantly the crystallization process that would occur in its absence. Typical seeds have an average particle size less than a micron, and the seed may or may not exhibit detectable crystallinity by x-ray diffraction. Such seeds are known in the art, and can come for a variety of sources, e.g., recycled fines from a prior crystallization process, or sodium silicate solutions. See U.S. Pat. No. 4,493,902.

The zeolites prepared in this fashion can have a pore structure with an opening in the range of 4 to 15 Angstroms, but preferably having a pore size of at least 7 Angstroms.

Alternatively, the zeolite is produced from clay that has already been formed in particulate suitable for use in a hydrocarbon conversion process, e.g., having an average particle size in the range of 20 to 150 microns. The clay particulate would then be contacted with the source of silica and under alkaline conditions to form zeolite on the surface of and within the particulate. This embodiment is also referred to herein as forming zeolite in situ within the clay particulate. This method of preparing the clay derived zeolite and catalysts therefrom is discussed in more detail below.

One embodiment utilizes zeolite prepared in accordance with U.S. Pat. No. 4,493,902, the contents of which are incorporated herein by reference. See methods disclosed in Column 8 of the '902 patent. Briefly, kaolin clay can be calcined through its characteristic transition phases, with the calcination temperature dictating which phase transition product is produced. In one embodiment, the clay is calcined at a temperature in the range of about 985 to about 1100° C. to produce spinel (but not mullite), or the kaolin can be calcined to temperatures above 1100° C. to produce mullite. The calcined product from either calcination can be milled or further processed to facilitate combination with additional clay. For example, either one or both types of calcined clays can be combined with kaolin for further processing, e.g., combining kaolin and its calcination product(s) in an aqueous slurry and spray drying the clays into particulates having an average particle size in the range of 20 to 150 microns. The particles are formed using conventional spray drying techniques.

The formed particulates are then calcined at a temperature in the range of about 480 to about 985° C. The calcination converts the kaolin into metakaolin, thereby resulting in a particulate comprising metakaolin and one or both of spinel and/or mullite kaolin phase transitions added in the initial slurry. Calcined particulates suitable for this invention therefore include those particulates comprising 20 to 60% by weight metakaolin and 40-75% clay calcined to one or more of its characteristic phase transitions, e.g., calcined product comprising spinel, mullite and/or mixtures thereof.

Other embodiments of this invention include forming separate particulates of kaolin and separate particulates of calcined kaolin, mixing the separate particulates and then calcining the mixture of particulates to form a composition having 20 to 60% by weight metakaolin and 40-75% calcined clay comprising spinel, mullite or mixtures thereof.

Zeolite can be formed with the clay particulate by treating the particulate with source of silica and under alkaline conditions, optionally including seeds as described above. The treatment is typically conducted in an aqueous slurry. The treatment typically comprises heating the particulates and source of silica to a temperature and for a time to produce particulates comprising zeolite, e.g., zeolite Y, in amounts of at least 30%, and typically in the range of 50 to 70% by weight zeolite. The heating temperature can be in the range of 82 to 110° C., and heating conducted for 10 to 120 hours.

Another embodiment comprises using clay particulates prepared in accordance with U.S. Pat. No. 6,656,347, the contents of which are incorporated herein by reference. Briefly, the clay is processed into a zeolite containing particulate comprising macroporous matrix and crystallized zeolite coating the walls of the matrix pores.

The zeolites prepared according to this invention can be, and are typically, further processed to enhance the performance of the zeolite as a catalyst. Further processing includes washing the zeolite and/or removing impurities, e.g., sodium compounds or "soda", resulting from the formation of the zeolite. Processing includes exchanging the zeolite using conventional techniques to remove sodium. The exchange can occur prior to or after combining the particulates with the yttrium compound. The zeolites are typically exchanged with rare earth. It is contemplated that if the exchange is conducted after addition of yttrium, the exchange is limited to minimize any exchange of yttrium to maximize the zeolite surface area retention benefit.

The invention therefore can comprise processing the zeolite to lower the sodium level of the zeolite to 0.1 wt % to 14 wt % $Na_2O$. Further processing also includes an ion-exchange as described above, and calcination at temperatures in the range of 100 to 750° C. to facilitate subsequent processing (exchange) to lower the $Na_2O$ content of the catalyst to the aforementioned levels. Conventional processes using ammonium, e.g., ammonium nitrate, are suitable for conducting the ion exchange.

Further processing the zeolite as described above, can also be conducted after combining the zeolite with yttrium compound, e.g., especially after one were to add the yttrium to the zeolite via exchange. In such embodiments, after the yttrium exchange of the zeolite, $Na_2O$ can be present in amounts of about 4% by weight oxide on sieve. In typical embodiments, the yttrium exchanged zeolite would then be processed via ion exchange to lower $Na_2O$ to amounts below 1.0% by weight $Na_2O$.

Zeolites prepared from clay typically have levels of metal impurities in range of 0.2 to 3% by weight of the zeolite. These impurities are naturally found in the starting clays, and end up as residue impurities in the zeolite product. The impurities comprise metallic species of various forms and compounds, and commonly comprise compounds derived from metals such as iron, titanium, magnesium, calcium and mixture of two or more thereof. Typically, the metal impurities comprise iron oxide and/or oxides of magnesium, calcium, potassium and titanium. See for example U.S. Pat. No. 5,891, 326. It is believed that these metal impurities act to destabilize the silica alumina structure of the zeolite, which in turn causes loss of zeolite surface area, which in turn further translates in lower conversion activity with respect to cracking hydrocarbons. The process of this invention is directed to addressing this problem, especially to the extent the metal impurities are difficult to remove.

Yttrium

The yttrium compound is added to the process of this invention in an amount ranging from about 0.5 to about 15% by weight, measured as $Y_2O_3$, of the zeolite with which the yttrium is combined.

The zeolites are typically washed and dried prior to combination with the yttrium compound, depending on whether it is desirable to reduce $Na_2O$ before addition of the yttrium compound. Indeed, processes in accordance with the invention will typically comprise adding the yttrium compound to the zeolite after the zeolite has been processed, e.g., exchanged and washed to remove $Na_2O$. It is also contemplated, however, that yttrium compound can be added to the zeolite prior to reducing its $Na_2O$ content. The yttrium compound can also be added prior to, during, or after adding optional components such as rare earth.

The amount of added yttrium in the final catalyst can alternatively be measured as an oxide in amounts measured in grams per square meter of catalyst surface area. For example, the aforementioned yttrium can each be present in amounts of at least about 5 $\mu g/m^2$ of total catalyst surface area. More typically, yttrium can be found in amounts of at least about 20 $\mu g/m^2$ of the total catalyst. The weight and surface area are measured, respectively, by ICP and BET surface area methodologies.

In one embodiment of the invention, the yttrium is combined with the zeolite so that yttrium is directly exchanged onto the zeolite prior to its addition of any optional components. This embodiment can be carried out in an aqueous exchange bath comprising soluble yttrium salt. Suitable soluble salts include yttrium halides (e.g., chlorides, bromides, fluorides, and iodides), nitrates, sulfates, acetates, carbonates, bromates, and iodates. Water soluble salts of this embodiment, e.g., those listed above except carbonates, which are characterized here as acid soluble, are added as an aqueous solution having a yttrium concentration in the range of 1 to about 40% by weight, possibly containing one or more rare earth in a ratio by weight with $Y_2O_3$ of 0.01 to 1, but preferably with a ratio of no more than 0.5. It is preferable that the yttrium compound consist essentially of yttrium compounds or yttrium containing moieties, and any amount of rare earth is minimal and preferably present in amounts so that no more than 5% by weight based on the zeolite is present in the final catalyst. Solutions of the above salts can also be used with a number of embodiments of the invention, including adding the yttrium to the zeolite along with any optional components described later below, or when yttrium is added to a zeolite containing particulate prepared from caustic treating a clay particulate that has been processed to a form suitable for use in FCC.

Yttrium compound can also be impregnated onto the zeolite, or a zeolite containing particulate using conventional processes, e.g., adding an aqueous solution of yttrium compound to the zeolite until incipient wetness, and then drying the impregnated zeolite or particulate.

While not typical or preferable, yttrium compounds such as yttrium oxide or yttrium hydroxide may be utilized in this invention. Compounds such as yttrium oxide and/or yttrium hydroxide are relatively insoluble in water, but soluble in acidic environments, e.g., acid binders. Yttrium hydroxide and yttrium oxide can added to the clay derived zeolite in the presence of such binders in order to exchange yttrium into the zeolite.

It is generally desirable for yttrium to be located within the pores of the zeolite. A significant portion of the added yttrium will be located in the pores of the zeolite, when yttrium is added via the pre-exchange method described above. It is possible, however, that a portion of the yttrium could also be located in pores of the catalyst matrix. The presence of yttrium in the catalyst matrix is frequently found when utilizing the embodiment of the invention in which yttrium is added to the zeolite in the slurry of zeolite, matrix precursor and/or any other optional components, and the slurry is processed to form the final catalyst material. The appearance of yttrium in catalyst matrix pores is also found in embodiments utilizing zeolite produced in situ within clay particulates. In these embodiments, the yttrium can be in the matrix in amounts up to about 25% of the yttrium present in the composition.

Matrix and Binder Precursors

Additional components, including, but not limited to, precursors for matrix and/or binders can be combined with the zeolite and yttrium compound. Additional components would be suitable, and in certain embodiments such as those using zeolite prepared from clay in a particle size range of 0.01 to 10 microns, would be necessary to make a catalyst suitable for use in FCC. The invention would therefore further comprise forming catalyst particulates from the zeolite, yttrium and matrix and/or binder precursors. Such precursors can also be used in embodiments using zeolite derived from clay particulates having an average particle size in the range of 20 to 150 microns. For example, the precursor can be added to the clay prior to being particulated. Indeed, alumina rich precursors may be desirable if utilizing a clay particulate formed in accordance with U.S. Pat. No. 6,656,347. These components are called precursors because they are further processed and/or transformed through processing in the presence of the zeolite and yttrium compound to form a matrix or binder for the final catalyst form containing the zeolite and yttrium.

Suitable matrix precursor materials include, but are not limited to, active matrices such as alumina, silica, porous alumina-silica, and kaolin clay. Alumina is preferred for some embodiments of the invention, and may form all or part of an active-matrix component of the catalyst. By "active" it is meant the material has activity in converting and/or cracking hydrocarbons in a typical FCC process.

Peptized aluminas suitable for making catalysts, and in particular for making FCC catalysts, are also suitable See for example, U.S. Pat. Nos. 7,208,446; 7,160,830; and 7,033,487. Peptized alumina herein specifically refer to those peptized with an acid and may also be called "acid peptized alumina". Acid peptized alumina is prepared from an alumina capable of being peptized, and would include those known in the art has having high peptizability indices. See U.S. Pat. No. 4,086,187; or alternatively those aluminas described as peptizable in U.S. Pat. No. 4,206,085. Suitable aluminas include those described in column 6, line 57 through column 7, line 53 of U.S. Pat. No. 4,086,187, the contents of which are incorporated by reference.

Suitable precursors of binders include those materials capable of binding the matrix and zeolite into particles. Specific suitable binders include, but are not limited to, alumina sols, silica sols, aluminas, and silica aluminas Other Optional Components Optional components in addition to matrix and binder precursors can be those conventionally added to FCC catalysts to reduce emissions, e.g., $NO_x$ and $SO_x$ species, from regenerator exhaust, to reduce sulfur content in gasoline prepared from FCC naphtha fraction product, etc. ZSM5-containing additives and/or products for enhancing olefins in a FCC process are also suitable for an optional component herein.

Process of Making the Catalyst

The process for this invention comprises combining the clay derived zeolite and yttrium, with optional combination with matrix and/or binder precursors, and other optional components described above. The clay derived zeolite is that prepared by treatment of clay as described earlier, and the process includes, but is not necessarily limited to, the following specific processes.

(1) Ion exchanging or impregnating the clay derived zeolite with yttrium compound, and then combining the ion exchanged or impregnated zeolite with matrix and/or binder precursors, and any other optional components mentioned earlier and forming the combination to produce a catalyst therefrom.

(2) Combining the clay derived zeolite, yttrium compound, matrix and/or binder precursors, and any other optional components, simultaneously or in any sequence, and forming the combination to produce the desired catalyst.

(3) Forming a clay-containing particulate having a size and form suitable for being fluidized, treating the particulate with silica source, optionally with seeds, and under alkaline conditions to form zeolite, combining the zeolite with yttrium compound in the form of an exchange medium or bath, or via impregnation. The resulting particulate material can then further dried to produce a desired catalyst.

As mentioned above, spray drying is one process that can be used in any of the above-described methods to form the combination into particulates that ultimately are the desired catalyst. Spray drying conditions are known in the art. For example, after combining the yttrium exchanged zeolite of (1), or the zeolite and yttrium compound in (2), with the matrix precursor and any other optional components in water, the resulting slurry can be spray dried into particles, e.g., microspheres, having an average particle size in the range of about 20 to about 150 microns. Spray drying can also be used to prepare the clay particulate in method (3). The inlet temperature for the spray dryer is in the range of 220 to 540° C. while the outlet temperature is in the range of 130 to 180° C.

As mentioned earlier, the yttrium compound in any of the above methods is generally in the form of an yttrium salt, and includes, but is not limited to yttrium halides such as chlorides, bromides, and iodides. Yttrium sulfate, nitrates and acetates are also suitable yttrium compounds. The source of the yttrium is preferably aqueous based and yttrium can be present at concentrations of about 1 to about 40%. If the yttrium is to be exchanged with the zeolite prior to addition to matrix and/or binder precursors and any other optional components, it is usually preferable to conduct the exchange such that at least 15% and up to about 90% of exchange sites present on the zeolite are exchanged with yttrium cations.

If the yttrium compound is from a rare earth ore, lanthanum and/or lanthanide salts of rare earth may also be present in the yttrium compound and/or yttrium exchange bath. Yttrium compounds comprising such rare earth(s) in a ratio by weight of 0.01 to 1 rare earth oxide to yttrium oxide is suitable. It is preferable that the yttrium compound consistent essentially of yttrium compound or yttrium containing moieties, and any amount of rare earth is minimal and preferably rare earth only present in amounts so that no more than 5% by weight based on the zeolite is present in the catalyst.

In the instance that matrix and binder precursors are included as optional components, these materials are added to the zeolite and yttrium compound mixture as dispersions, solids, and/or solutions. Suitable matrix and binder precursors are generally described earlier. A kaolin clay matrix precursor is particularly suitable, and particularly suitable materials for binders include aluminum chlorohydrol or a silica sol such as Ludox® colloidal silica available from W.R. Grace & Co.-Conn. are suitable as a binder.

Once the catalyst has been formed, the catalyst can be further processed using conventional techniques. For example, it is optional to wash the catalyst to remove excess alkali metal (e.g., $Na_2O$), which are known contaminants to catalysts, especially FCC catalysts. The catalyst can be washed one or more times, preferably with water, ammonium hydroxide and/or aqueous ammonium salt solutions, such as ammonium sulfate, ammonium chloride or ammonium nitrate solutions. The washed catalyst is separated from the wash slurry by conventional techniques, e.g. filtration, and dried to lower the moisture content of the particles to a desired level, typically at temperatures ranging from about 100° C. to 300° C.

The dried catalyst is then ready as a finished catalyst "as is", or it can be calcined for activation prior to use. The catalyst particles, for example, can be calcined at temperatures ranging from about 250° C. to about 800° C. for a period of about 10 seconds to 4 hours. Preferably, the catalyst particles are calcined at a temperature in the range of about 350 to 600° C. for about ten seconds to two hours.

The invention prepares catalyst that can be used as a catalytic component of the circulating inventory of catalyst in a catalytic cracking process, e.g., an FCC process. For convenience, the invention will be described with reference to the FCC process although the present catalyst could be used in a moving bed type (TCC) cracking process with appropriate adjustments in particle size to suit the requirements of the process. Apart from the addition of the present catalyst to the catalyst inventory and some possible changes in the product recovery section, discussed below, the manner of operating a FCC process will not be substantially different.

The invention is however particularly suited for FCC processes in which a hydrocarbon feed will be cracked to lighter products by contact of the feed in a cyclic catalyst recirculation cracking process with a circulating fluidizable catalytic cracking catalyst inventory consisting of particles having a size ranging from about 20 to about 150 microns. The significant steps in the cyclic process are: (i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons; (ii) the effluent is discharged and separated, normally in one or more cyclones, into a vapor phase rich in cracked product and a solids rich phase comprising the spent catalyst; (iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Typical FCC processes are conducted at reaction temperatures of about 480° C. to about 570° C., preferably from 520 to 550° C. The regeneration zone temperatures will vary depending on the particular FCC unit. As it is well known in the art, the catalyst regeneration zone may consist of a single or multiple reactor vessels. Generally, the regeneration zone temperature ranges from about 650 to about 760° C., preferably from about 700 to 730° C.

The stripping zone can be suitably maintained at a temperature in the range from about 470 to about 560° C., preferably from about 510 to about 540° C.

Catalysts prepared from clay derived zeolites are from time to time employed in FCC processes conducted under the above conditions. Such catalysts, as with catalyst prepared with other zeolites, are frequently added to the circulating FCC catalyst inventory while the cracking process is underway, or they may be present in the inventory at the start-up of the FCC operation. As will be understood by one skilled in the art, the catalyst particles may alternatively be added directly to the cracking zone, to the regeneration zone of the FCC cracking apparatus, or at any other suitable point in the FCC process.

This invention is particularly useful when making catalysts with clay derived zeolites, especially those comprising metal impurities. The examples below show that clay-derived zeolites, are inherently less stable than zeolites synthesized from higher purity reagents, such as sodium silicate and sodium aluminate. The instability is attributed to the metal impurities and small crystal size of clay-based zeolites. It has been found, surprisingly, that when clay-based zeolites are exchanged with yttrium, its stability disadvantage vis-à-vis zeolites synthesized from higher purity reagents is eliminated. When yttrium is a component in catalyst containing such clay-based zeolites, and in particular when yttrium is added as a replacement component for rare earth, a frequent component in FCC catalyst, the catalyst shows increased zeolite surface area retention and activity after being deactivated using standard deactivation protocol for evaluating catalyst activity and properties. The examples below indicate that the same effect is not attained in catalyst prepared with other types of zeolites. Accordingly, it is submitted that the invention results in a clay derived zeolite catalyst having unexpectedly more stable activity.

Other catalytically active components may be present in the circulating inventory of catalytic material in addition to a cracking catalyst prepared by this invention and/or may be included with the invention when the invention is being added to a FCC unit. Examples of such other materials include the octane enhancing catalysts based on zeolite ZSM-5, CO combustion promoters based on a supported noble metal such as platinum, stack gas desulfurization additives such as DESOX® (magnesium aluminum spinel), vanadium traps, bottom cracking additives, such as those described in Krishna, Sadeghbeigi, op cit and Scherzer, "Octane Enhancing Zeolitic FCC Catalysts", Marcel Dekker, N.Y., 1990, ISBN 0-8247-8399-9, pp. 165-178 and gasoline sulfur reduction products such as those described in U.S. Pat. No. 6,635,169. These other components may be used in their conventional amounts.

It is also within the scope of the invention to use the cracking catalyst compositions of the invention alone or in combination with other conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay. The Y zeolite in such catalysts may be present in one or more forms and may have been ultra stabilized and/or treated with stabilizing cations such as any of the rare earths.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

A zeolite derived from clay was prepared as follows, and then used in the Examples that follow.

A reaction mixture with a molar ratio of 7.7 $SiO_2$:$Al_2O_3$: 2.3 $Na_2O$:100 $H_2O$ was made by mixing 3712 grams of seeds, 17671 grams of sodium silicate, 14862 grams of water, and 250 grams of sodium hydroxide. As soon as the sodium hydroxide dissolved, 3505 grams of metakaolin clay were stirred in, and the mixture was held at 99° C. for one hour with stirring. The reaction mixture was then aged for five days in an oven set at 100° C. After the five days, the zeolite product was filtered and washed with water, rinsed with 40 kg 10% ammonium sulfate solution, and water-washed again.

The zeolite product was further processed to remove sodium from the zeolite. The zeolite was first calcined at 621° C. (1150° F.) for one hour, then reslurried and stirred in ammonium sulfate bath. The weight ratios of zeolite, ammonium sulfate and deionized water were 1:1:10. Product was filtered and again reslurried in ammonium sulfate bath at lower ammonium sulfate concentration (The weight ratios of zeolite, ammonium sulfate and deionized water were 1:0.25:10). The product was then rinsed and washed again and submitted for elemental analysis which is reported in column 2 of Table 1 below.

A reference USY zeolite was also selected for use in the Examples below. This zeolite is one that has been utilized in commercial catalysts, and was prepared using raw materials other than clay. The elemental analysis for this zeolite appears in Column 1 of Table 1

TABLE 1

| Sample Comments: | 1<br>Reference USY Zeolite | 2<br>Clay Based Zeolite |
|---|---|---|
| $Al_2O_3$, %: | 22.80 | 23.88 |
| $Fe_2O_3$, %: | 0.14 | 0.72 |
| $Na_2O$, %: | 0.67 | 0.64 |
| $RE_2O_3$, %: | 0.03 | 0.01 |
| $SiO_2$, %: | 75.70 | 73.15 |
| $TiO_2$, % | 0.078 | 1.42 |
| Surface Area, $m^2/g$: | 795 | 804 |
| Matrix Surface Area (MSA), $m^2/g$: | 51 | 46 |
| Zeolite Surface Area (ZSA), $m^2/g$: | 744 | 758 |

The composition of yttrium solution and lanthanum solution used in the Examples below contain elements as indicated in Table 2 below. The solutions are aqueous based, and $RE_2O_3$ refers to total content of lanthanum and lanthanide metals, with the content of lanthanum and lanthanide metal, if present, separately listed following the entry for $RE_2O_3$. Each element is reported below as an oxide.

TABLE 2

| Solution Content: | $YCl_3$ Solution | $LaCl_3$ Solution |
|---|---|---|
| $Y_2O_3$, %: | 22.65 | 0.01 |
| $RE_2O_3$, %: | 0.15 | 27.06 |
| $La_2O_3$, %: | 0.09 | 17.92 |
| $CeO_2$, %: | 0.05 | 3.42 |
| $Na_2O$, %: | 0.01 | 0.27 |
| $Nd_2O_3$, %: | 0.01 | 1.28 |
| $Pr_6O_{11}$, %: | 0.00 | 0.81 |
| $Sm_2O_3$, %: | 0.00 | 1.23 |

Example 1

Catalyst 1 is made from the lanthanum solution and the reference USY zeolite described above. Aqueous solutions of 5856 grams (1558 g on a dry base) of the reference USY, 3478 grams (800 g on a dry basis) of aluminum chlorohydrol, 947 grams (500 g on a dry basis) of alumina, 2471 grams (2100 g on a dry basis) of clay, and 370 grams (100 g on a dry basis) lanthanum solution were added and mixed for about 10 minutes. The mixture was milled in a Drais mill to reduce particle size and spray dried in a Bowen spray dryer at an inlet temperature of 343° C. The spray dryer feed solids content is about 38% by weight. The spray dried particles were calcined for 1 hour at 593° C.

A second catalyst was prepared similarly as Catalyst 1 except the USY zeolite was replaced with the clay derived zeolite described above. Aqueous solutions of 2431 grams (1281 g on a dry basis) of the clay derived zeolite, 2365 grams (544 g on a dry basis) of aluminum chlorohydrol, 982 grams (340 g on a dry basis) of alumina, 1440 grams (1224 g on a dry basis) of clay, and 252 grams (68 g on a dry basis) lanthanum solution were added and mixed for about 10 minutes. The mixture was milled in a Drais mill to reduce particle size and spray dried in a Bowen spray dryer at an inlet temperature of 343° C. The spray dryer feed solids content is about 40% by weight. The spray dried particles were calcined for 1 hour at 593° C. The second catalyst is referred to below as Catalyst 2.

Example 2

Catalyst 3 is made from the yttrium solution and the reference USY zeolite utilized in Example 1. Aqueous solutions of 5856 grams (1558 g on a dry basis) of the reference USY, 3478 grams (800 g on a dry basis) of aluminum chlorohydrol, 947 grams (500 g on a dry basis) of alumina, 2471 grams (2100 g on a dry basis) of clay, and 307 grams (70 g on a dry basis) yttrium solution were added and mixed for about 10 minutes. The mixture was milled in a Drais mill to reduce particle size and spray dried in a Bowen spray dryer at an inlet temperature of 343° C. The spray dryer feed solids content is about 38% by weight. The spray dried particles were calcined for 1 hour at 593° C.

Catalyst 4 was prepared similarly to that of Catalyst 3 except the USY zeolite was replaced with the clay derived zeolite described above. Aqueous solutions of 2431 grams (1281 g on a dry basis) of the clay derived zeolite, 2365 grams (544 g on a dry basis) of aluminum chlorohydrol, 982 grams (340 g on a dry basis) of alumina, 1440 grams (1224 g on a dry basis) of clay, and 219 grams (48 g on a dry basis) yttrium solution were added and mixed for about 10 minutes. The mixture was milled in a Drais mill to reduce particle size and spray dried in a Bowen spray dryer at an inlet temperature of 343° C. The spray dryer feed solids content is about 40% by weight. The spray dried particles were calcined for 1 hour at 593° C. The fourth catalyst is referred to below as Catalyst 4.

Example 3

The physical and chemical properties (fresh) of Catalysts 1, 2, 3, and 4 are listed on Table 3 below.

It is seen from Table 3 that Catalyst 4 made with clay derived zeolite and $YCl_3$ had similar attrition (DI), higher ABD (average bulk density), and similar surface areas as the Catalyst 2 made with clay derived zeolite and $LaCl_3$. To determine the Davison Attrition Index (DI) of the invention, 7.0 cc of sample catalyst is screened to remove particles in the 0 to 20 micron range. Those remaining particles are then contacted in a hardened steel jet cup having a precision bored orifice through which an air jet of humidified (60%) air is passed at 21 liter/minute for 1 hour. The DI is defined as the percent of 0-20 micron fines generated during the test relative to the amount of >20 micron material initially present, i.e., the formula below.

$$DI = 100 \times (\text{wt \% of 0-20 micron material formed during test})/(\text{wt of original 20 microns or greater material before test}).$$

All four catalysts were then deactivated using deactivation protocol CPS, with no metals, and surface area measurements were taken using standard BET techniques. The CPS protocol is known in the art. See Lori T. Boock, Thomas F. Petti, and John A. Rudesill, *ACS Symposium Series*, 634, 1996, 171-183). The results are also reported in Table 3 below. CPS means cyclic propylene steaming.

In summary, substituting rare earth with yttrium in catalysts comprising conventional zeolite USY did not show better zeolite surface area retention, as compared to when adding yttrium to a catalyst comprising clay derived zeolite. It is therefore submitted that the benefits of this invention were unexpected.

TABLE 3

|  | Catalyst 1 Reference Zeolite with La | Catalyst 2 Clay Zeolite with La | Catalyst 3 Reference Zeolite with Y | Catalyst 4 Clay Zeolite with Y |
|---|---|---|---|---|
| $Al_2O_3$, %: | 48.15 | 49.26 | 47.42 | 48.48 |
| $Na_2O$, %: | 0.33 | 0.37 | 0.41 | 0.37 |
| $RE_2O_3$, %: | 2.16 | 2.18 | 0.20 | 0.19 |
| $La_2O_3$, %: | 1.82 | 2.08 | 0.04 | 0.17 |
| $Y_2O_3$, %: | 0.00 | 0.00 | 1.34 | 1.25 |
| $Fe_2O_3$, %: | 0.66 | 0.76 | 0.66 | 0.79 |
| $TiO_2$, %: | 1.06 | 1.59 | 1.03 | 1.56 |
| Measured "Fresh" | | | | |
| ABD, g/cm³: | 0.72 | 0.72 | 0.70 | 0.79 |
| DI, -: | 5 | 4 | 3 | 3 |
| APS, microns: | 66 | 64 | 62 | 60 |
| Pore Volume, cm³/g: | 0.41 | 0.40 | 0.44 | 0.39 |
| Surface Area, m²/g: | 266 | 285 | 274 | 276 |
| Zeolite Surface Area (ZSA), m²/g: | 211 | 220 | 216 | 211 |
| Matrix Surface Area (MSA), m²/g: | 56 | 65 | 58 | 65 |
| After Deactivation with CPS No Metals | | | | |
| Surface Area, m²/g: | 172 | 154 | 176 | 156 |
| Zeolite Surface Area (ZSA), m²/g: | 131 | 113 | 134 | 113 |
| Matrix Surface Area (MSA), m²/g: | 41 | 41 | 42 | 43 |
| ZSA Retention, % | 62.1 | 51.4 | 62.0 | 53.6 |

Example 4

All four deactivated catalysts from Example 3 were then run through an Advanced Cracking Evaluation (ACE) unit. The deactivated samples were evaluated in an ACE Model AP Fluid Bed Microactivity unit from Kayser Technology, Inc. See also, U.S. Pat. No. 6,069,012. The reactor temperature was 527° C. The results of that study appear in Table 4 below.

TABLE 4

| Description: | Catalyst 1 Reference Zeolite with La | Catalyst 2 Clay Zeolite with La | Catalyst 3 Reference Zeolite with Y | Catalyst 4 Clay Zeolite with Y |
|---|---|---|---|---|
| Conversion at 4@CatOil | 68.7 | 64.3 | 69.0 | 69.4 |
| Yields at 75 wt % Conversion | | | | |
| Catalyst to Oil Ratio | 6.23 | 7.06 | 5.92 | 5.83 |
| Dry Gas | 1.55 | 1.58 | 1.53 | 1.54 |
| Total C3's | 5.65 | 6.20 | 5.59 | 5.91 |
| Total C4s | 12.16 | 12.70 | 11.77 | 12.36 |
| Gasoline | 53.04 | 51.74 | 53.32 | 52.64 |

TABLE 4-continued

| Description: | Catalyst 1 Reference Zeolite with La | Catalyst 2 Clay Zeolite with La | Catalyst 3 Reference Zeolite with Y | Catalyst 4 Clay Zeolite with Y |
|---|---|---|---|---|
| LCO | 19.10 | 19.46 | 19.21 | 19.46 |
| Bottoms | 5.90 | 5.54 | 5.79 | 5.54 |
| Coke | 2.68 | 2.92 | 2.83 | 2.84 |

Comparing lanthanum-stabilized zeolites, in going from conventional zeolite (Catalyst 1) to clay-based zeolite (Catalyst 2), there is a significant decrease in the activity of the catalyst (4.4 wt % absolute lower conversion at a catalyst to oil ratio of 4). Furthermore, there is an increase in coke. This shows that clay-based zeolite is inherently less stable and less selective than conventional zeolites. In contrast, going from conventional zeolite (Catalyst 3) to clay-based zeolite (Catalyst 4), there is no decrease in activity or increase in coke. The addition of a yttrium compound therefore improves the inherently poorer stability and selectivity of clay-based zeolite. This is an unexpected finding.

Example 5

Additional samples of Catalysts 2 and 4 were steam deactivated using the following deactivation protocols.
Protocols: 4 hours with 100% steam varying the temperatures at 760° C. (1400° F.), 788° C. (1450° F.), and 816° C. (1500° F.).
The deactivated samples were then measured for surface area using BET and zeolite retention was calculated for each catalyst and deactivation protocol. The results appear below in Table 5. It is seen that Catalyst 4 retains more zeolite surface area compared to the corresponding lanthanum and lanthanide containing catalyst.

TABLE 5

|  | Catalyst 2 | Catalyst 4 |
|---|---|---|
| % ZSA Retention after 4 hours at 760° C. | 64.5 | 66.4 |
| % ZSA Retention after 4 hours at 788° C. | 56.8 | 57.8 |
| % ZSA Retention after 4 hours at 816° C. | 40.9 | 43.1 |

What we claim is:

1. A process for making a catalyst, the process comprising:
    (a) treating clay with source of silica and under alkaline conditions to produce clay-derived Y zeolite, and
    (b) combining the clay-derived Y zeolite with yttrium compound, wherein yttrium measured as yttrium oxide ($Y_2O_3$) is present in the combination in an amount of 0.5 to 15% by weight based on the zeolite.
2. A process according to claim 1, wherein the clay is kaolin or one or more of kaolin clay's characteristic phase transitions.
3. A process according to claim 1, wherein the alkaline conditions include contacting the clay with a compound selected from the group consisting of alkali hydroxide, silicate, aluminate, and mixtures thereof.
4. A process according to claim 1, wherein the source of silica is selected from the group consisting of silica gel, colloidal silica, precipitated silica, rice hull ash, sodium silicate, and/or mixtures thereof.
5. A process according to claim 1, further comprising adding seed to the clay and source of silica.
6. A process according to claim 1, wherein the zeolite produced in (a) comprises at least one metal impurity.
7. A process according to claim 6 wherein the metal impurity comprises a compound derived from a metal selected from the group consisting of iron, titanium, magnesium, calcium and mixture of two or more thereof.
8. A process according to claim 1, wherein the zeolite and yttrium compound are combined in (b) with precursors of matrix, and the process further comprises forming particulates.
9. A process according to claim 8 wherein the zeolite produced in (a) is crystalline, and has an average particle size in the range of 0.05 to 10 microns.
10. A process according to claim 8, wherein the particulates have an average particle size in the range of 20 to 150 microns.
11. A process according to claim 1 wherein the yttrium compound is water soluble yttrium salt.
12. A process according to claim 1 wherein the yttrium compound is selected from the group consisting of yttrium halide, yttrium nitrate, yttrium carbonate, and yttrium sulfate.
13. A process according to claim 1, wherein the clay in (a) is present in particulates having an average particle size in the range of 20 to 150 microns, and zeolite is produced in situ within the clay particulate.
14. A process according to claim 13 wherein the yttrium compound is combined with the zeolite by impregnation of yttrium into the particulate.
15. A process according to claim 14 wherein the impregnation is carried out with an aqueous solution comprising yttrium salt in a concentration in the range of 1 to 40% by weight measured as yttrium oxide.
16. A process according to claim 13, further comprising drying the zeolite particulates after its combination with the yttrium compound in (b).
17. A process according to claim 1, wherein the yttrium compound comprises rare earth oxide in a weight ratio of 0.01 to 1 rare earth oxide to yttrium oxide.
18. A process according to claim 1, wherein the yttrium compound consists essentially of yttrium compound or an yttrium moiety.
19. A process according to claim 8, wherein the precursor of matrix comprises inorganic oxide selected from the group consisting of silica, alumina, silica alumina, and clay.
20. A process according to claim 1, wherein the zeolite and yttrium compound are combined in (b) with a precursor of binder.
21. A catalyst made by a process in accordance with claim 1.
22. A catalyst made by a process in accordance with claim 21, wherein the catalyst contains no more than 5% by weight rare earth, measured as oxide, based on the zeolite.
23. A process according to claim 11, wherein the yttrium compound comprises rare earth oxide in a weight ratio of 0.01 to 1 rare earth oxide to yttrium oxide.
24. A process according to claim 12, wherein the yttrium compound comprises rare earth oxide in a weight ratio of 0.01 to 1 rare earth oxide to yttrium oxide.
25. A process according to claim 11, wherein the yttrium compound consists essentially of yttrium compound or an yttrium moiety.
26. A process according to claim 12, wherein the yttrium compound consists essentially of yttrium compound or an yttrium moiety.

* * * * *